US007289955B2

(12) United States Patent
Deng et al.

(10) Patent No.: US 7,289,955 B2
(45) Date of Patent: *Oct. 30, 2007

(54) METHOD OF DETERMINING UNCERTAINTY ASSOCIATED WITH ACOUSTIC DISTORTION-BASED NOISE REDUCTION

(75) Inventors: Li Deng, Redmond, WA (US); Alejandro Acero, Bellevue, WA (US); James G. Droppo, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/642,389

(22) Filed: Dec. 20, 2006

(65) Prior Publication Data

US 2007/0106504 A1    May 10, 2007

Related U.S. Application Data

(60) Division of application No. 10/236,042, filed on Sep. 5, 2002, now Pat. No. 7,174,292, and a continuation-in-part of application No. 10/152,143, filed on May 20, 2002, now Pat. No. 7,107,210, which is a continuation-in-part of application No. 10/152,127, filed on May 20, 2002, now Pat. No. 7,103,540.

(51) Int. Cl.
*G10L 15/20* (2006.01)
*G10L 21/02* (2006.01)
(52) U.S. Cl. .................. 704/226; 704/233; 704/240
(58) Field of Classification Search ............ 704/226, 704/227, 228, 233, 236, 240, 243, 244
See application file for complete search history.

(56) References Cited

U.S. PATENT DOCUMENTS

| 4,897,878 | A |   | 1/1990  | Boll et al. |
|-----------|---|---|---------|-------------|
| 4,905,286 | A | * | 2/1990  | Sedgwick et al. .......... 704/233 |
| 5,148,489 | A |   | 9/1992  | Erell et al. |
| 5,604,839 | A |   | 2/1997  | Acero et al. |
| 5,924,065 | A |   | 7/1999  | Eberman et al. |
| 6,098,040 | A |   | 8/2000  | Petroni et al. |
| 6,173,258 | B1|   | 1/2001  | Menendez-Pidal et al. |
| 6,202,047 | B1|   | 3/2001  | Ephraim et al. |
| 6,418,411 | B1|   | 7/2002  | Gong |
| 6,577,997 | B1|   | 6/2003  | Gong |
| 6,633,842 | B1|   | 10/2003 | Gong |

(Continued)

OTHER PUBLICATIONS

Wikipedia, "Computational formula for the variance", One Page.*

(Continued)

*Primary Examiner*—Martin Lerner
(74) *Attorney, Agent, or Firm*—Theodore M. Magee; Westman, Champlin & Kelly, P.A.

(57) ABSTRACT

A method and apparatus are provided for determining uncertainty in noise reduction based on a parametric model of speech distortion. The method is first used to reduce noise in a noisy signal. In particular, noise is reduced from a representation of a portion of a noisy signal to produce a representation of a cleaned signal by utilizing an acoustic environment model. The uncertainty associated with the noise reduction process is then computed. In one embodiment, the uncertainty of the noise reduction process is used, in conjunction with the noise-reduced signal, to decode a pattern state.

6 Claims, 4 Drawing Sheets

U.S. PATENT DOCUMENTS

| | | | |
|---|---|---|---|
| 6,633,843 B2 | 10/2003 | Gong | |
| 6,763,075 B2* | 7/2004 | Zhengdi et al. | 375/341 |
| 6,865,531 B1 | 3/2005 | Huang | |
| 6,876,966 B1 | 4/2005 | Deng et al. | |
| 6,898,566 B1 | 5/2005 | Benyassine et al. | |
| 6,915,259 B2 | 7/2005 | Rigazio et al. | |
| 6,944,590 B2 | 9/2005 | Deng et al. | |
| 6,959,276 B2 | 10/2005 | Droppo et al. | |
| 6,980,952 B1 | 12/2005 | Gong | |
| 6,985,858 B2 | 1/2006 | Frey et al. | |
| 6,990,447 B2 | 1/2006 | Attias et al. | |
| 7,003,455 B1 | 2/2006 | Deng et al. | |
| 7,103,540 B2 | 9/2006 | Droppo et al. | |
| 7,107,210 B2 | 9/2006 | Deng et al. | |
| 7,174,292 B2* | 2/2007 | Deng et al. | 704/226 |
| 7,181,390 B2* | 2/2007 | Droppo et al. | 704/226 |
| 7,200,557 B2* | 4/2007 | Droppo et al. | 704/242 |
| 7,206,741 B2* | 4/2007 | Deng et al. | 704/254 |
| 7,254,536 B2* | 8/2007 | Deng et al. | 704/226 |
| 2003/0055627 A1 | 3/2003 | Balan et al. | |
| 2003/0055640 A1 | 3/2003 | Burshtein et al. | |
| 2003/0191638 A1 | 10/2003 | Droppo et al. | |

OTHER PUBLICATIONS

U.S. Appl. No. 10/152,127, filed Jan. 2006, Droppo et al.

U.S. Appl. No. 10/152,143, filed May 2002, Deng et al.

Droppo, J. et al, "Uncertainty Decoding with Splice for Noise Robust Speech Recognition," Proceedings of International Conference on Acoustics, Speech and Signal Processing, pp. I-57-I-60, vol. 1, May 2002.

Droppo, J. et al, "Evaluation of the SPLICE Algorithm on the Aurora2 Database," 7th European Conference on Speech Communication and Technology, Proceedings of Eurospeech 2001, Aalborg, Denmark, Sep. 2001.

Li Deng et al, "A Bayesian Approach to Speech Feature Enhancement using the Dynamic Cepstral Prior," Proceedings of International Conference on Acoustics, Speech and Signal Processing, pp. I-829-I-832, vol. 1, May 2002.

PCT Search Report for International Application No. PCT/US 03/16032.

U.S. Appl. No. 10/236,042, filed Sep. 5, 2002, Li Deng et al.

"HMM Adaptation Using Vector Taylor Series for Noisy Speech Recognition," Alex Acero, et al., Proc. ICSLP, vol. 3, 2000, pp. 869-872.

"Sequential Noise Estimation with Optimal Forgetting for Robust Speech Recognition," Mohomed Afify, et al., Proc. ICASSP, vol. 1, 2001, pp. 229-232.

"High-Performance Robust Speech Recognition Using Stereo Training Data," Li Deng, et al., Proc. ICASSP, vol. 1, 2001, pp. 301-304.

"ALGONQUIN: Iterating Laplace's Method to Remove Multiple Types of Acoustic Distortion for Robust Speech Recognition," Brendan J. Frey, et al., Proc. Eurospeech, Sep. 2001, Aalborg, Denmark.

"Nonstationary Environment Compensation Based on Sequential Estimation," Nam Soo Kim, IEEE Signal Processing Letters, vol. 5, 1998, pp. 57-60.

"On-line Estimation of Hidden Markov Model Parameters Based on the Kullback-Leibler Information Measure," Vikram Krishnamurthy, et al., IEEE Trans. Sig. Proc., vol. 41, 1993, pp. 2557-2573.

"A Vector Taylor Series Approach for Environment-Independent Speech Recognition," Pedro J. Moreno, ICASSP, vol. 1, 1996, pp. 733-736.

"Recursive Parameter Estimation Using Incomplete Data," D.M. Titterington, J. J. Royal Stat. Soc., vol. 46(B), 1984, pp. 257-267.

"The Aurora Experimental Framework for the Performance Evaluations of Speech Recognition Systems Under Noisy Conditions," David Pearce, et al., Proc. ISCA IIRW ASR 2000, Sep. 2000.

"Efficient On-Line Acoustic Environment Estimation for FCDCN in a Continuous Speech Recognition System," Jasha Droppo, et al., ICASSP, 2001.

"Speech Recognition in Noisy Environments," Pedro J. Moreno, Ph.D thesis, Carnegie Mellon University, 1996.

"Robust Automatic Speech Recognition With Missing and Unreliable Acoustic Data," Martin Cooke, Speech Communication, vol. 34, No. 3, pp. 267-285, Jun. 2001.

"Learning Dynamic Noise Models From Noisy Speech for Robust Speech Recognition," Brendan J. Frey, et al., Neural Information Processing Systems Conference, 2001, pp. 1165-1121.

"Speech Denoising and Dereverberation Using Probabilistic Models," Hagai Attias, et al., Advances in NIPS, vol. 13, 2000 pp. 758-764.

"Statistical-Model-Based Speech Enhancement Systems," Proc. of IEEE, vol. 80, No. 10, Oct. 1992, pp. 1526.

"HMM-Based Strategies for Enhancement of Speech Signals Embedded in Nonstationary Noise," Hossein Sameti, IEEE Trans. Speech Audio Processing, vol. 6, No. 5, Sep. 1998, pp. 445-455.

"Model-based Compensation of the Additive Noise for Continuous Speech Recognition," J.C. Segura, et al., Eurospeech 2001, Sep. 2001.

"Large-Vocabulary Speech Recognition Under Adverse Acoustic Environments," Li Deng, et al., Proc. ICSLP, vol. 3, 2000, pp. 806-809.

"A New Method for Speech Denoising and Robust Speech Recognition Using Probabilistic Models for Clean Speech and for Noise," Hagai Attias, et al., Proc. Eurospeech, 2001, pp. 1903-1906.

"Recursive Noise Estimation Using Iterative Stochastic Approximation For Stereo-Based Robust Speech Recognition," Deng, et al., Proceedings of Automatic Speech Recognition and Understanding 2001.

Office Action (Feb. 16, 2006) and Response (May 16, 2006) from U.S. Appl. No. 10/152,127, filed May 20, 2002.

Office Action (Feb. 14, 2006) and Response (May 12, 2006) from U.S. Appl. No. 10/152,143, filed May 20, 2002.

Office Action (May 11, 2006) and Response (Aug. 11, 2006) from U.S. Appl. No. 10/236,042, filed Sep. 5, 2002.

Deng et al., "Incremental Bayes Learning with Prior Evolution for Tracking Nonstationary Noise Statistics from Noisy Speech Data," ICASSP '03. Apr. 6-10, 2003, vol. 1, pp. I-672 to I-675.

Droppo et al, "Noise Robust Speech Recognition with a Switching Linear Dynamic Model," ICASSP '04, May 17-24, 2004, vol. 1, pp. I-953 to I-956.

Deng et al., "Estimating Cepstrum of Speech Under the Presence of Noise Using a Joint Prior of Static and Dynamic Features," IEEE Transactions on Speech and Audio, May 2004, vol. 12, Issue 3, pp. 218-233.

* cited by examiner

METHOD OF DETERMINING UNCERTAINTY ASSOCIATED WITH ACOUSTIC DISTORTION-BASED NOISE REDUCTION

REFERENCE TO RELATED APPLICATIONS

This application is a divisional of and claims priority from U.S. patent application Ser. No. 10/236,042 filed on Sep. 5, 2002, now U.S. Pat. No. 7,142,292 issued 6 Feb. 2007 which was a continuation-in-part of U.S. patent application Ser. No. 10/152,127, filed May 20, 2002, now U.S. Pat. No. 7,103,540 issued 5 Sep. 2006 and entitled METHOD OF PATTERN RECOGNITION USING NOISE REDUCTION UNCERTAINTY, and was a continuation-in-part of U.S. patent application Ser. No. 10/152,143, filed May 20, 2002, now U.S. Pat. No. 7,107,210 and entitled METHOD OF NOISE REDUCTION BASED ON DYNAMIC ASPECTS OF SPEECH.

BACKGROUND OF THE INVENTION

The present invention relates to pattern recognition. In particular, the present invention relates to performing pattern recognition after noise reduction.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for a model to work optimally, the signals used to train the model should be similar to the eventual test signals that are decoded. In particular, it is desirable that the training signals contain the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data. These noise reduction techniques result in a cleaned test signal that is then used during pattern recognition. In most systems, the noise reduction technique produces a sequence of multi-dimensional feature vectors, with each feature vector representing a frame of a noise-reduced signal.

Unfortunately, noise reduction techniques do not work perfectly and as a result, there is some inherent uncertainty in the cleaned signal. In the past, there have been two general techniques for dealing with such uncertainty. The first has been to ignore the uncertainty and treat the noise reduction process as being perfect. Since this ignores the true state of the recognition system, it results in recognition errors that could be avoided.

The other prior art technique for dealing with uncertainty in noise reduction is to identify frames of the input signal where the noise reduction technique is likely to have performed poorly. In these frames, dimensions of the feature vectors that are likely in error are marked by the noise reduction system so that they are not used during recognition. Thus, the feature vector components that have more than a predetermined amount of uncertainty are completely ignored during decoding. Although such systems acknowledge uncertainty in noise reduction, the technique of completely ignoring a component treats the component as providing no information that would be helpful during recognition. This is highly unlikely because even with a significant amount of uncertainty, the noise-reduced component still provides some information that would be helpful during recognition.

In addition, the prior art has not provided a means for determining the uncertainty of some noise-removal processes. As a result, it has not been possible to determine the uncertainty associated with those processes.

In light of this, techniques are needed to identify the uncertainty in noise reduction and use that uncertainty during pattern recognition.

SUMMARY OF THE INVENTION

A method and apparatus are provided for reducing noise in a noisy signal. In particular, noise is reduced from a representation of a portion of a noisy signal to produce a representation of a cleaned signal by utilizing an acoustic environment model. The uncertainty associated with the noise reduction process is then computed. In one embodiment, the uncertainty of the noise reduction process is used to decode a pattern state from the cleaned signal.

DETAILED DESCRIPTION OF ILLUSTRATIVE EMBODIMENTS

Figure 1:
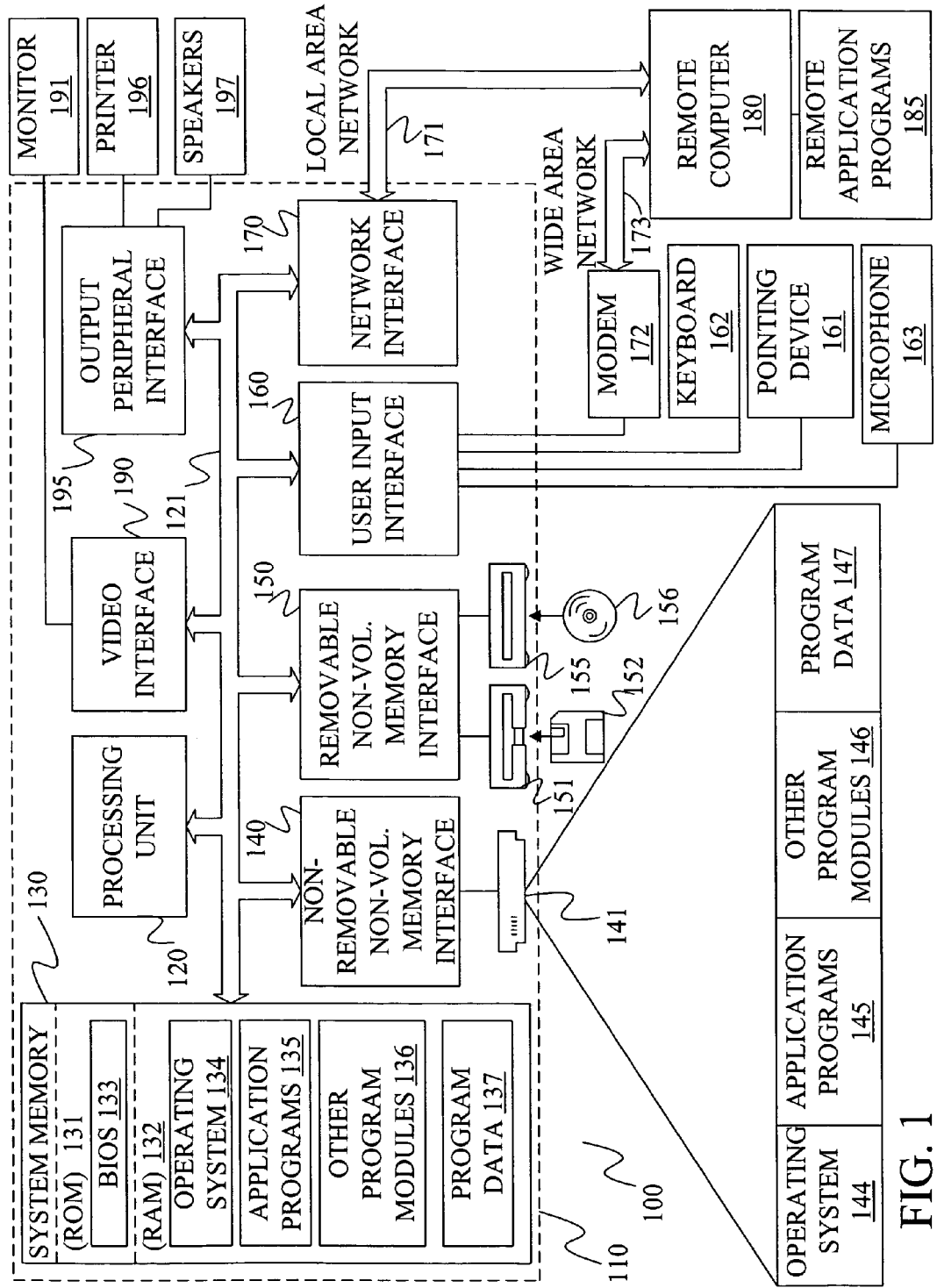
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
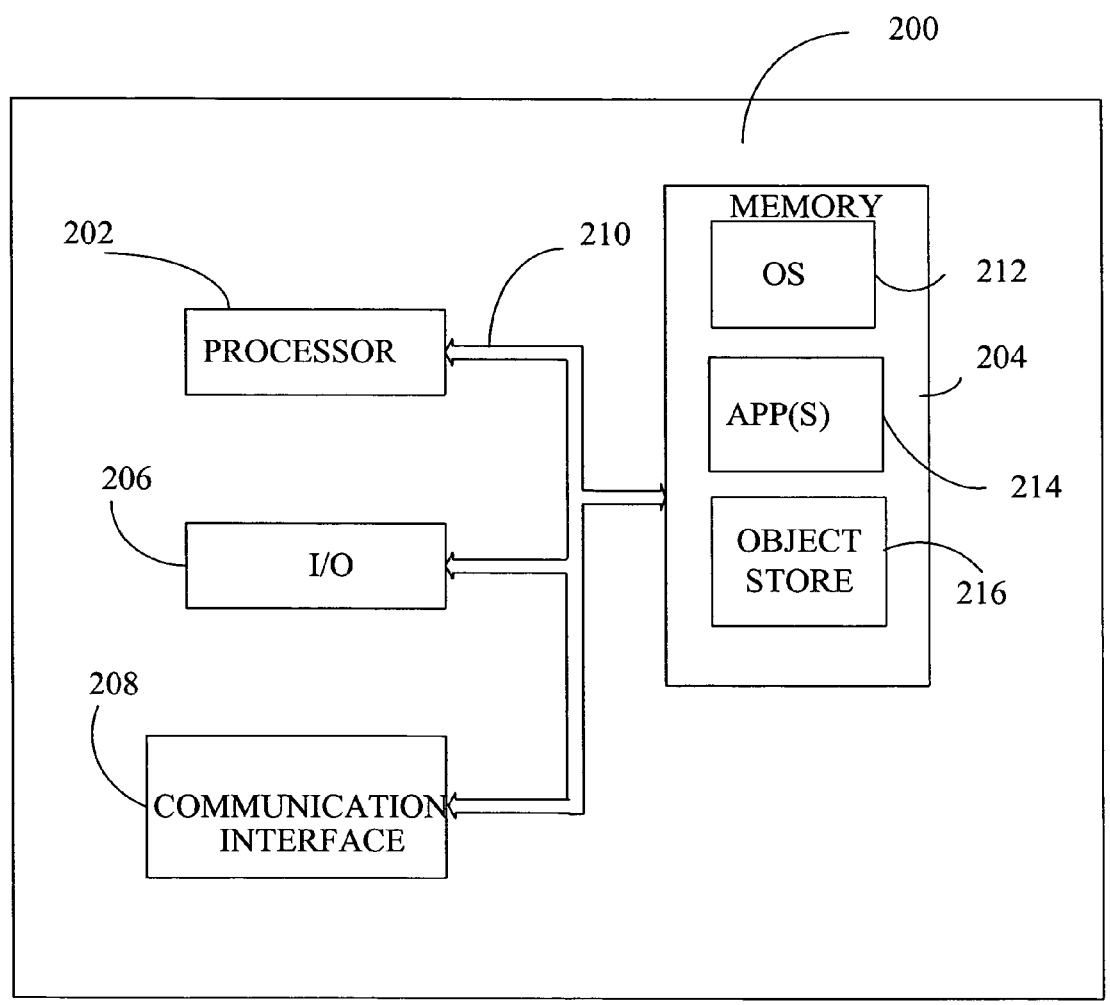
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In the discussion below, the present invention is described with reference to speech recognition to facilitate understanding of the invention. However, those skilled in the art will recognize that the present invention is not limited to speech recognition and may be used in any pattern recognition system.

The goal of speech recognition is to convert a speech signal into a sequence of words. To do this, the speech signal is typically divided into overlapping frames of speech and each frame is converted into a feature vector, y, which describes the content of the frame. During recognition, also referred to as decoding, an acoustic model is used to identify a most likely sequence of phonetic states that could be represented by the feature vectors. The resulting sequence of phonetic states represents the decoded sequence of words.

Many acoustic models evaluate a mixture of Gaussians to determine the probability of any one phonetic state. Thus, at each frame, a mixture of Gaussians is evaluated for each phonetic state to identify the most likely phonetic state for the frame. The evaluation of each Gaussian can be viewed as determining $p(y|m)$, which is the probability of the feature vector, y, given the mixture component m for the phonetic state.

When using noise-reduction in combination with speech recognition, a noisy input feature vector, y, is converted into a cleaned feature vector, $\hat{x}$, by the noise-reduction system. The cleaned feature vector represents an estimate of an actual clean feature vector, x. The cleaned feature vector, $\hat{x}$, is then applied as an input signal to the speech recognition system, which attempts to identify a most-likely phonetic state given the cleaned feature vector.

Without noise corruption, the observation vector, y, is the same as the clean vector, x. As such, evaluating a Gaussian for a mixture component for a clean observation vector $p(y|m)$ is the same as evaluating the probability of clean vector x given mixture component m, $p(x|m)$.

However, when the observation vector is corrupted by noise and a noise-reduction system is used, the input to the recognizer is no longer the ideal clean vector, x, but instead is the cleaned feature vector, $\hat{x}$, which is only an estimate of x. In the past, it has been common to simply treat the cleaned feature vector, $\hat{x}$, as if it were equal to the ideal clean feature vector, x. In such cases, evaluating a Gaussian for a mixture component $p(y|m)$ has been approximated by determining the probability $p(\hat{x}|m)$.

Under the present invention, a more rigorous approach is used in which the probability $p(y|m)$ is determined by marginalizing a joint conditional probability density function $p(y,x|m)$ over all possible unseen clean speech vectors. In terms of an equation:

$$p(y|m) = \int_{-\infty}^{\infty} p(y, x|m)dx \qquad \text{EQ. 1}$$

The right-hand side of EQ. 1 may be expanded so that EQ. 1 becomes:

$$p(y|m) = \int_{-\infty}^{\infty} p(y|x, m)p(x|m)dx \qquad \text{EQ. 2}$$

To make the computations associated with EQ. 2 easier to implement, the probability $p(y|x,m)$ is assumed to be independent of m so that it becomes p(y|x). This probability is then modeled as a Gaussian distribution that describes the certainty of the noise reduction process. In particular:

$$p(y|x) = \alpha N(\hat{x}; x, \sigma_{\hat{x}}^2) \qquad \text{EQ. 3}$$

where the distribution is defined across the cleaned feature vectors, $\hat{x}$, and has a mean equal to the ideal clean feature vector, $x$, and a variance, $\sigma_{\hat{x}}^2$, that represents the variance associated with the noise reduction process. Note that in EQ. 3 a simplified notation has been used to represent the Gaussian distribution as a single Gaussian across the entire vector. In fact, there is a separate Gaussian, with its own mean and variance, for each dimension of the feature vector. For example:

$$p(y_l|x_l) = \alpha N(\hat{x}_l; x_l, \sigma_{\hat{x},l}^2) \qquad \text{EQ. 4}$$

where $y_l$ is component l of the noisy feature vector, $x_l$ is component l of the clean feature vector, $\hat{x}_l$ is component l of the cleaned feature vector, and $\sigma_{\hat{x},l}^2$ is the variance (also referred to as uncertainty) associated with the noise reduction process for component l of the feature vectors.

The prior probability, p(x|m), is also modeled as a collection of Gaussian distributions, one for each component of the vector, such that:

$$p(x_l|m) = N(x_l; \mu_{m,l}, \sigma_{m,l}^2) \qquad \text{EQ. 5}$$

where $\mu_{m,l}$ is the mean of the prior distribution, and $\sigma_{m,l}^2$ is the variance of the distribution for component l of the feature vectors.

Combining equations 2, 4 and 5 and evaluating the integral provides:

$$p(y_l|m) = \alpha N(\hat{x}_l; \mu_{m,l}, \sigma_{m,l}^2 + \sigma_{\hat{x},l}^2) \qquad \text{EQ. 6}$$

Thus, under the framework of the present invention, the variance of the distribution used in the acoustic model is a combination of the variance associated with the prior model, $\sigma_{m,l}^2$, and the variance or uncertainty associated with the noise reduction process, $\sigma_{\hat{x},l}^2$. As a result, if the uncertainty associated with the noise reduction process is high for a component, there will be little difference between the probabilities generated for each phonetic state. As a result, the component will have little effect on the decoding of the phonetic state sequence. However, if the uncertainty of the noise reduction process is small, the acoustic models for the various phonetic states will generate distinctive probabilities for the component and the component will thereby strongly influence the selection of the phonetic state.

Under one embodiment of the present invention, the noise reduction process utilizes a prior model of dynamic aspects of clean speech, a prior model of static aspects of clean speech, and an acoustic-distortion or acoustic-environmental model that describes the relationship between clean speech, noisy speech and noise. The invention thus provides a technique for determining the uncertainty in this parametric-based noise reduction process.

In the discussion below, the noise reduction method is performed in the cepstral domain. In particular, each frame of clean speech, noisy speech, and noise, is represented by a cepstral feature vector that is formed by taking the logarithm and discrete cosine transform of the frequency-domain representation of the signal within the frame. Thus, in the discussion below, the method attempts to identify a noise-reduced feature vector from a noisy speech feature vector. As with Equation 3 above, a simplified notation is used below that treats each vector as being represented by a single distribution. In implementation, there is a separate distribution for each component of the vector.

To reduce the noise from the noisy vector, the minimum mean square estimate of the noise-reduced vector is determined using the conditional expectation:

$$\hat{x}_t = E[x_t|y_t, \hat{x}_{t-1}] = \int x_t p(x_t|y_t, \hat{x}_{t-1}) dx_t \qquad \text{EQ. 7}$$

where $\hat{x}_t$ is the estimate for the noise-reduced feature vector of the current frame, $\hat{x}_{t-1}$ is the estimate for the noise-reduced feature vector determined for a previous frame, $y_t$ is a noisy speech feature vector for the current frame, and $x_t$ is a clean speech feature vector for the current frame.

Using Bayes rule, the estimate in Equation 1 can be restated as:

$$\hat{x}_t = \frac{\int x_t p(x_t|\hat{x}_{t-1}) p(y_t|x_t) dx_t}{p(y_t)} \qquad \text{EQ. 8}$$

where $p(x_t|\hat{x}_{t-1})$ is the conditional probability of a clean speech vector, $x_t$, given the estimate of the clean speech vector at the preceding frame, $\hat{x}_{t-1}$, $p(y_t|x_t)$ is the conditional probability of a noisy speech vector, $y_t$, given a clean speech vector, $x_t$, and $p(y_t)$ is the probability of a noisy speech vector, $y_t$.

Under one embodiment of the present invention, a mixture model is used to describe the conditional probability $p(x_t|\hat{x}_{t-1})$. In terms of an equation:

$$p(x_t|\hat{x}_{t-1}) = \sum_{m=1}^{M} c_m p(x_t|m, \hat{x}_{t-1}) \qquad \text{EQ. 9}$$

where the conditional prior probability $p(x_t|m, \hat{x}_{t-1})$ is the probability provided by the mth mixture component and $c_m$ is a weighting factor for the mth mixture component.

Under one embodiment, noisy speech is considered to be the result of noise being added to clean speech. This provides an acoustic environment model otherwise known as a distortion model for the noisy speech. In the time domain, this addition is linear. However, in the cepstral feature domain, this addition becomes non-linear resulting in a feature vector relationship of:

$$y_t = x_t + g(n_t - x_t) + r \qquad \text{EQ. 10}$$

where $$g(n_t - x_t) = \log(1 + e^{n_t - x_t}) \qquad \text{EQ. 11}$$

and r is a residual.

To make the expression of Equation 10 easier to use, the non-linearity is linearized using a truncated Taylor series approximation. In particular, a zero-th order Taylor series expansion on $g(n_t - x_t)$ at $x_t = x_0$ is used to form the approximation:

$$y_t \approx x_t + g(\bar{n} - x_0) + r \qquad \text{EQ. 12}$$

where $g(\bar{n} - x_0)$ is the zero-th order Taylor series expansion at expansion point $x_0$, and $\bar{n}$ is an estimate of the noise in the current frame. In most embodiments, the expansion point, $x_0$, is selected as the estimate of the clean speech signal determined during a previous iteration of the noise-reduction process, and $\bar{n}$ is determined using a recursive technique such as the one disclosed in a pending U.S. Patent Application entitled METHOD OF ITERATIVE NOISE ESTIMATION IN A RECURSIVE FRAMEWORK, filed on Apr. 5, 2002 and having Ser. No. 10/116,792 now U.S. Pat. No. 6,944,590 issued 13 Sep. 2005. Those skilled in the art will recognize that the recursive technique for noise estimation is one example of a number of different noise estimation techniques that may be utilized with the present invention.

Based on the relationship shown in Equation 12, the conditional probability $p(y_t|x_t)$ of Equation 8 becomes an acoustic environment probability $p(y_t|x_t,\bar{n}_t)$. Using this acoustic environment probability and Equation 9 above, Equation 8 can be re-written as:

$$\hat{x}_t = \frac{\sum_{m=1}^{M} c_m \int x_t p(x_t|m, \hat{x}_{t-1}) p(y_t|x_t, \bar{n}_t) dx_t}{p(y_t)} \quad \text{EQ. 13}$$

To compute the integral of Equation 13, the conditional prior, $p(x_t|m, \bar{x}_{t-1})$, is first evaluated. To make this evaluation easier, it is recognized that:

$$p(x_t|m,\hat{x}_{t-1}) \propto p(x_t, \Delta x_t|m) \quad \text{EQ. 14}$$

where $$\Delta x_t = x_t - \hat{x}_{t-1} \quad \text{EQ. 15}$$

Thus, in Equation 14, $x_t$ represents the static aspects of clean speech and $\Delta x_t$ represents the dynamic aspects of clean speech.

To further simplify the evaluation of the conditional prior, it is assumed that the static aspects of clean speech are uncorrelated to the dynamic aspects of clean speech. As a result:

$$p(x_t, \Delta x_t|m) = p(x_t|m) p(\Delta x_t|m) \quad \text{EQ. 16}$$

Under one embodiment, the prior probability for the static aspects of clean speech and the prior probability for the dynamic aspects of clean speech are each modeled as Gaussian distributions such that:

$$p(x_t, \Delta x_t|m) = N(x_t; \mu_m^x, \Phi_m^x) N(\Delta x_t; \mu_m^{\Delta x}, \Phi_m^{\Delta x}) \quad \text{EQ. 17}$$

where $\mu_m^x$ and $\Phi_m^x$ are the mean and variance of the prior model for the static aspects of clean speech, and $\mu_m^{\Delta x}$ and $\Phi_m^{\Delta x}$ are the mean and variance of the prior model for the dynamic aspects of clean speech.

Fitting the exponent in the product of the above two Gaussian distributions into the standard quadratic form in $x_t$, and using Equation 14 above, produces:

$$p(x_t|m,\hat{x}_{t-1}) = N(x_t; \mu_m, \Phi_m) \quad \text{EQ. 18}$$

where $$\mu_m = \frac{\Phi_m^{\Delta x}}{(\Phi_m^x + \Phi_m^{\Delta x})} \mu_m^x + \frac{\Phi_m^x}{(\Phi_m^x + \Phi_m^{\Delta x})} (x_{t-1} + \mu_m^{\Delta x}) \quad \text{EQ. 19}$$

and $$\Phi_m = \frac{\Phi_m^x \Phi_m^{\Delta x}}{(\Phi_m^x + \Phi_m^{\Delta x})} \quad \text{EQ. 20}$$

In many embodiments, the acoustic environment probability, $p(y_t|x_t,\bar{n}_t)$, is also modeled as a Gaussian distribution producing an acoustic model of the form:

$$p(y_t|x_t,n_t) = N(y_t; x_t + g(\bar{n} - x_0), \Psi) \quad \text{EQ. 21}$$

where $\Psi$ is a fixed diagonal covariance matrix that is an approximation to the covariance matrix for the residual r.

Thus, the integral in the numerator of Equation 13 becomes:

$$I_m = \int x_t N(x_t; \mu_m, \Phi_m) N(y_t; x_t + g(\bar{n} - x_0), \Psi) dx_t \quad \text{EQ. 22}$$

Evaluating the integral produces:

$$I_m = [v_1(m)\mu_m^x + v_2(m)(x_{t-1} + \mu_m^{\Delta x}) + w_2(m)(y_t - g(\bar{n} - x_0))] N_m(y_t) \quad \text{EQ. 23}$$

where $$N_m(y_t) = N(y_t; \mu_m^x + g(\bar{n} - x_0), \Phi_m^x + \Psi) \quad \text{EQ. 24}$$

$$v_1(m) = \frac{\Psi}{(\Phi_m^x + \Psi)} \frac{\Phi_m^{\Delta x}}{(\Phi_m^x + \Phi_m^{\Delta x})} \quad \text{EQ. 25}$$

$$v_2(m) = \frac{\Psi}{(\Phi_m^x + \Psi)} \frac{\Phi_m^x}{(\Phi_m^x + \Phi_m^{\Delta x})} \quad \text{EQ. 26}$$

$$w_2(m) = 1 - \frac{\Psi}{(\Phi_m^x + \Psi)} \quad \text{EQ. 27}$$

The Gaussian distribution in Equation 25 can be shown to be the likelihood of observation $y_t$ given the m-th component in the clean speech model under the zero-th order approximation made in Equation 15. That is:

$$p(y_t|m) \approx N_m(y_t) \quad \text{EQ. 28}$$

As a result, the denominator in Equation 13 can be determined as:

$$p(y_t) = \sum_{m=1}^{M} c_m p(y_t|m) \approx \sum_{m=1}^{M} c_m N_m(y_t) \quad \text{EQ. 29}$$

Combining Equations 13, 23, and 29 produces the estimator for $x_t$:

$$x_t = \sum_{m=1}^{M} \gamma_m(y_t) [v_1(m)\mu_m^x + v_2(m)(x_{t-1} + \mu_m^{\Delta x}) + w_2(m)(y_t - g(\bar{n} - x_0))] \quad \text{EQ. 30}$$

where $$\gamma_m(y_t) = \frac{c_m N_m(y_t)}{\sum_{m=1}^{M} c_m N_m(y_t)} \quad \text{EQ. 31}$$

Each summand in Equation 30 is a mixture component contribution to the final reduced-noise vector. Each summand is formed by multiplying the weighted sum of three terms by the relative probability of the noisy feature vector, $y_t$, occurring given the mixture component. The first term is the prediction of the reduced-noise vector taken from the mean of the static aspects of the prior clean speech model, $\mu_m^x$. The second term is the prediction for the reduced-noise vector based on the estimate of the reduced-noise vector for the preceding frame and the mean of the dynamic aspects of the prior clean speech model, $(x_{t-1}+\mu_m^{\Delta x})$. The last term, $y_t-g(\bar{n}-x_0)$, is the prediction for the noise-reduced clean-speech vector based on the acoustic distortion model in absence of any prior information.

Thus, the estimator of Equation 30 utilizes a prior model of static aspects of clean speech, a prior model of dynamic aspects of clean speech and an acoustic distortion model. As a result, the sequence of noise-reduced vectors produced using the estimator of Equation 30 contain fewer discontinuities and appear more natural.

In addition, the weighting values applied to each of the terms in each summand are such that as the variance of one of the terms increases, its relative weighting decreases. Thus, as a term becomes more accurate in its description of the noise-reduced value, its weighting increases relative to the weighting of the other terms.

For example, the weighting value applied to the value predicted by the prior model for static aspects of clean speech is a function of the variance of the prior model for dynamic aspects of clean speech. As a result, when the variance of the model for the dynamic aspects of cleans speech increases relative to the variance of the model for the static aspects of clean speech, the relative weighting of the value predicted by the prior model for static aspects increases.

A similar effect occurs for the weighting of the value predicted by the prior model for the dynamic aspects of clean speech, since this weighting value is a function of the variance of the prior model for the static aspects of clean speech.

Before the estimator of Equation 31 can be used, the parameters for the various models must be trained. Under one embodiment, an EM algorithm is used to train the mean and covariance parameters $\mu_m^x$, $\Phi_m^x$, $\mu_m^{\Delta x}$ and $\Phi_m^{\Delta x}$ in the cepstral domain. During this training process, the mixture component weights, $c_m$, are also trained. Techniques for performing such training are well known in the art. The fixed covariance matrix, $\Psi$, is estimated by pooling the training data with all available signal to noise ratios.

Under one embodiment, the noise reduced vector, $x_t$, is determined in an iterative fashion such that the value of the noise-reduced vector in a current iteration is used as the expansion point, $x_0$, of the Taylor Series approximation, $g(\bar{n}-x_0)$, in the next iteration. For the first iteration, the expansion point for the Taylor Series approximation is the mixture component mean, $\mu_m^x$, that provides the highest probability for the noisy vector using the normal distribution:

$$N(y_t;\mu_m^x+g(\bar{n}-x_0),\Psi) \quad \text{EQ. 32}$$

At each iteration, the noise-reduced vector is then calculated as:

$$\hat{x}_t^{j+1} = \quad \text{EQ. 33}$$
$$\sum_{m=1}^{M} \gamma_m^j(y_t)[v_1(m)\mu_m^x + v_2(m)(\hat{x}_{t-1}+\mu_m^{\Delta x}) + w_2(m)(y_t - g(\bar{n} - \hat{x}_t^j))]$$

where j represents an iteration counter and $$\gamma_m^j(y_t) = \frac{c_m N(y_t; \mu_m^x + g(\bar{n} - \hat{x}_t^j), \Phi_m^x + \Psi)}{\sum_{m=1}^{M} c_m N(y_t; \mu_m^x + g(\bar{n} - \hat{x}_t^j), \Phi_m^x + \Psi)} \quad \text{EQ. 34}$$

Thus, the expectation $\mu_{\hat{x}_t}$ for the noise-reduced vector is:

$$\mu_{\hat{x}_t}=\hat{x}_t^J \quad \text{EQ. 35}$$

where J is the total number of iterations.

Under the present invention, the uncertainty associated with the noise reduction process represented by the iteration of equation 33 is also calculated so that it can be used during recognition. The uncertainty is the variance $\Sigma_{\hat{x}_t}$ in $\mu_{\hat{x}_t}$, which is defined as:

$$\Sigma_{\hat{x}_t}=E[x_t^2|y_t]-\mu_{\hat{x}_t}^2 \quad \text{EQ. 36}$$

where $$E[x_t^2 | y_t] \approx \frac{\sum_{m=1}^{M} c_m \overbrace{\int x_t^2 p(x_t|m, \hat{x}_{t-1})p(y_t|x_t, \bar{n}_t)dx_t}^{I_m(y_t)}}{p(y_t)} \quad \text{EQ. 37}$$

Using the approximations and models of equations 14-21 above, the integral $I_m$, becomes:

$$I_m = \int x_t^2 N(x_t; \mu_m, \Phi_m) N(y_t; x_t + g(\bar{n}-x_0), \Psi) dx_t \quad \text{EQ. 38}$$
$$= \int x_t^2 N(x_t; \theta_m, (t), (\Phi_m + \Psi)^{-1}\Phi_m\Psi) dx_t \times N_m(y_t)$$
$$= [(\Phi_m + \Psi)^{-1}\Phi_m\Psi + \theta_m^2(t)] \times N_m(y_t)$$

where $$\mu_m = \frac{\Phi_m^{\Delta x}}{(\Phi_m^x + \Phi_m^{\Delta x})}\mu_m^x + \frac{\Phi_m^x}{(\Phi_m^x + \Phi_m^{\Delta x})}(x_{t-1} + \mu_m^{\Delta x}) \quad \text{EQ. 39}$$

$$\Phi_m = \frac{\Phi_m^x \Phi_m^{\Delta x}}{(\Phi_m^x + \Phi_m^{\Delta x})} \quad \text{EQ. 40}$$

$$\theta_m(t) = (\Phi_m + \Psi)^{-1}[\Psi\mu_m + \Phi_m(y_t - g(\bar{n}-x_0))] \quad \text{EQ. 41}$$

$$N_m(y_t) = N(y_t; \mu_m + g(\bar{n}-x_0), \Phi_m + \Psi) \quad \text{EQ. 42}$$

Substituting the result of equation 38 into equation 37 we obtain:

$$E[x_t^2 | y_t] \approx \sum_{m=1}^{M} \gamma_m(y_t)[(\Phi_m + \Psi)^{-1}\Phi_m\Psi + \theta_m^2(t)] \quad \text{EQ. 43}$$

where $$\gamma_m(y_t) = \frac{c_m N_m(y_t)}{\sum_{m=1}^{M} c_m N_m(y_t)} \quad \text{EQ. 44}$$

The value calculated in Equation 43 is then used together with the square of the expectation for the noise reduced vector calculated in equations 33-35 to determine the uncertainty of the noise reduction process using equation 36 above. Note that in Equation 36, $\Sigma_{\hat{x}_t}$ is a vector representation of the uncertainty and that it represents a separate uncertainty $\sigma_{\hat{x},i}^2$ for each component of the static noise reduced vector $\mu_{\hat{x}_t}$.

Equations 33-35 above determine the static components of the noise reduced vector. Under embodiments of the present invention, differentials of these static components that describe how the components change between frames can also be determined. These differentials are referred to generically as dynamic features. Under the present invention, two types of dynamic features are determined. One is the delta feature that indicates changes between frames, and the other is the acceleration feature that indicates the rate of change of the delta features. Under one embodiment, the delta features are calculated as:

$$\Delta \hat{x}_t = \sum_{\tau=-K}^{K} \omega_\tau \hat{x}_{t+\tau}$$ EQ. 45 where $\Delta \hat{x}_t$ is the dynamic feature for the noise reduced vector, K indicates the number of neighboring frames that are to be used to determine the dynamic features, and $\omega_\tau$ are fixed weights that provide relative weighting to the neighboring frames. Note that the vector notation is used in equation 45 to indicate that a separate calculation is performed for each component of the noise-reduced feature vectors.

Acceleration features can also be determined based on the delta features calculated in Equation 45. Specifically:

$$\Delta^2 \hat{x}_t = \sum_{\tau=-K}^{K} \upsilon_\tau \Delta \hat{x}_{t+\tau}$$ EQ. 46 where $\Delta^2 \hat{x}_t$ is the acceleration feature for the noise reduced vector, K indicates the number of neighboring frames that are to be used to determine the dynamic features, and $\upsilon_\tau$ are fixed weights that provide relative weighting to the neighboring frames.

The delta and acceleration features are provided to the decoder along with the static noise-reduced features. In addition, the uncertainty of the delta and acceleration features are calculated and provided to the decoder. Specifically the uncertainty of the delta and acceleration features are calculated as:

$$\sum_{\Delta \hat{x}_t} = \sum_{\tau=-K}^{K} \omega_\tau^2 \sum_{\Delta \hat{x}_t}$$ EQ. 47

$$\sum_{\Delta^2 \hat{x}_t} = \sum_{\tau=-K}^{K} \upsilon_\tau^2 \sum_{\Delta \hat{x}_t}$$ EQ. 48 where $\Sigma_{\hat{x}_t}$ is the uncertainty calculated in Equation 36 above, $\Sigma_{\Delta \hat{x}_t}$ is the uncertainty in the delta features, $\Sigma_{\Delta^2 \hat{x}_t}$ is the uncertainty in the acceleration features and $\omega_\tau$ and $\upsilon_\tau$ are the same weights used in Equations 45 and 46.

The uncertainty of the static features, the delta features and the acceleration features are each used in Equation 6 to determine the probability of corresponding features of the noisy feature vector during decoding. In particular, each component of the delta feature and acceleration feature calculated in Equations 45 and 46 is treated as a separate component of the noise-reduced vector and the corresponding uncertainty associated with each component of the delta vector and each acceleration vector is used as an uncertainty $\sigma_{x,I}^2$, in Equation 6.

Figure 3:
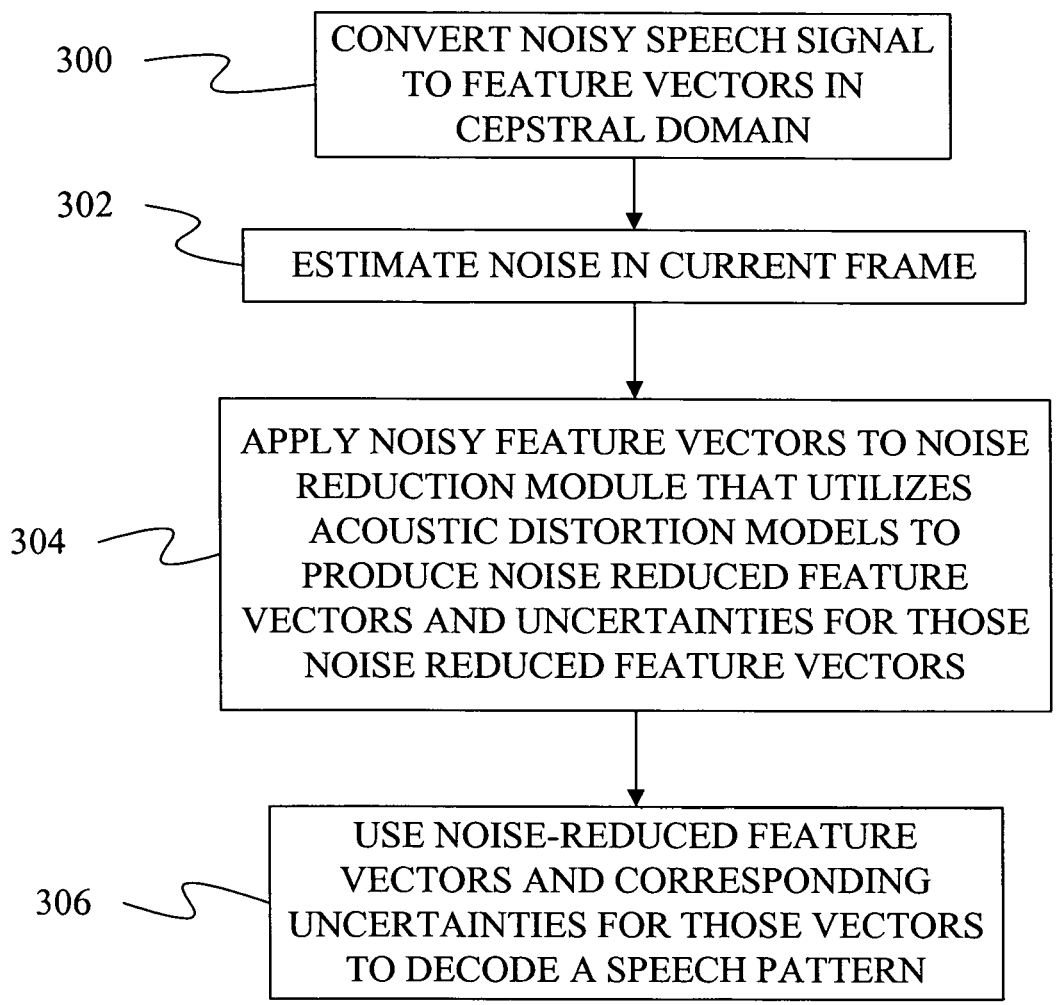
FIG. 3 is a flow diagram of a method of using a noise reduction system of one embodiment of the present invention.
Figure 4:
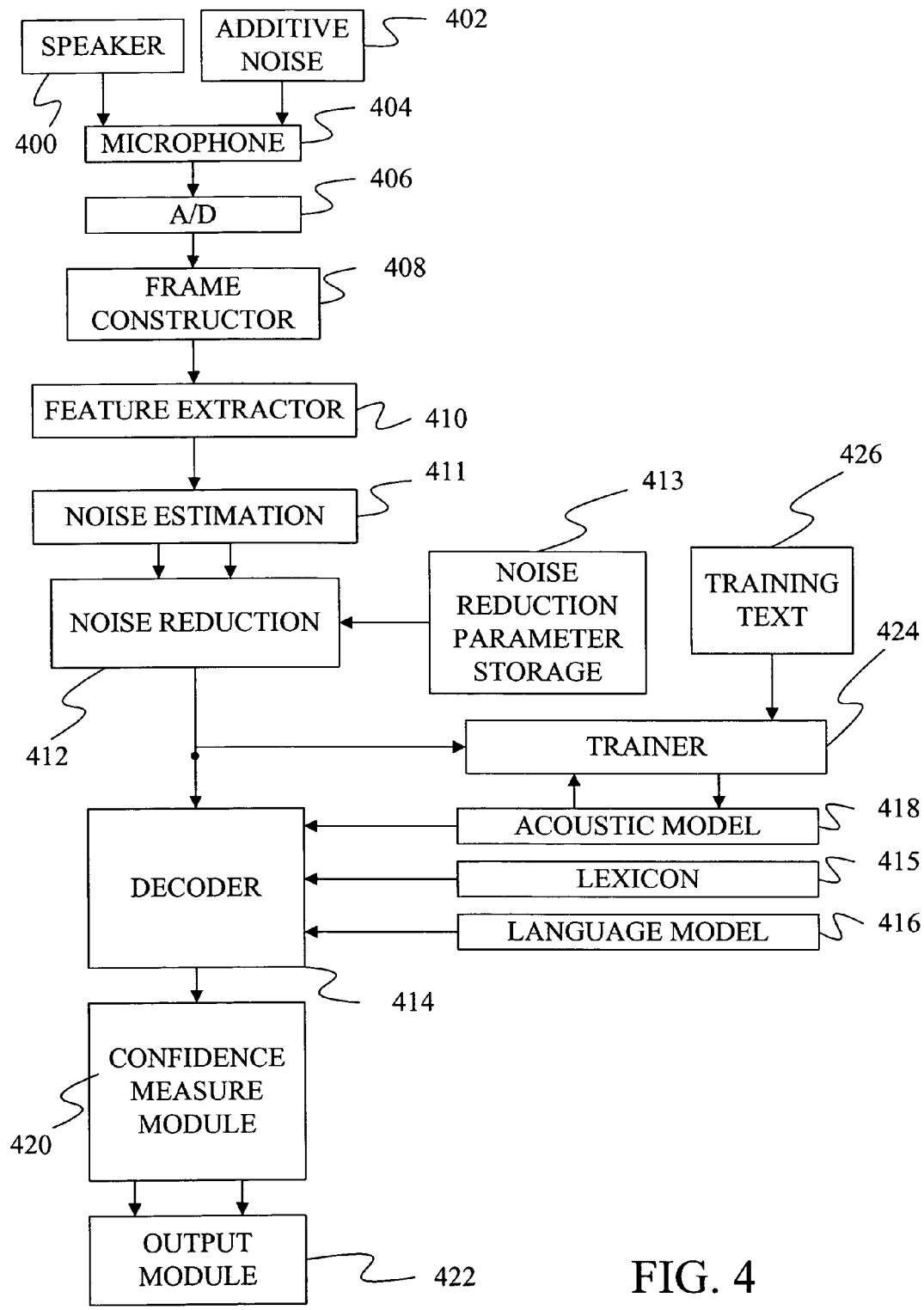
FIG. 4 is a block diagram of a pattern recognition system in which embodiments of the present invention may be used.

A method and system for using the present invention in speech recognition is shown in the flow diagram of FIG. 3 and the block diagram of FIG. 4. The method begins in step 300 of FIG. 3, where a noisy speech signal is converted into a sequence of feature vectors. To do this, a microphone 404 of FIG. 4, converts audio waves from a speaker 400 and one or more additive noise sources 402 into electrical signals. The electrical signals are then sampled by an analog-to-digital converter 406 to generate a sequence of digital values, which are grouped into frames of values by a frame constructor 408. In one embodiment, A-to-D converter 406 samples the analog signal at 16 kHz and 16 bits per sample, thereby creating 32 kilobytes of speech data per second and frame constructor 408 creates a new frame every 10 milliseconds that includes 25 milliseconds worth of data.

Each frame of data provided by frame constructor 408 is converted into a feature vector by a feature extractor 410. Methods for identifying such feature vectors are well known in the art and include 13-dimensional Mel-Frequency Cepstrum Coefficients (MFCC) extraction.

In step 302 of FIG. 3, the feature vectors for the noisy speech signal are provided to a noise estimation module 411 in FIG. 4. Noise estimation module 411 estimates the noise in the current frame and provides a feature vector representing the noise estimate together with the noisy speech signal to a noise reduction module 412.

In step 304 of FIG. 3, noise reduction module 412 uses Equations 33-35, 45 and 46 above and the model parameters of those equations, which are stored in noise reduction parameter storage 413, to produce a sequence of noise-reduced feature vectors from the sequence of noisy feature vectors. In particular, noise reduction module 412 uses an acoustic distortion model as described above. In addition, noise reduction module 412 uses equations 36-44, 47 and 48 to determine an uncertainty associated with forming the noise reduced feature vectors.

The output of noise reduction module 412 is a series of noise-reduced feature vectors and a corresponding series of uncertainties associated with those noise-reduced feature vectors. If the input signal is a training signal, the series of noise-reduced feature vectors are provided to a trainer 424, which uses the noise-reduced feature vectors and a training text 426 to train an acoustic model 418. Techniques for training such models are known in the art and a description of them is not required for an understanding of the present invention.

If the input signal is a test signal, the noise-reduced feature vectors and the corresponding uncertainties are provided to a decoder 414, which identifies a most likely sequence of words based on the stream of feature vectors, the stream of uncertainties, a lexicon 415, a language model 416, and the acoustic model 418 as shown by step 306 of FIG. 3. Specifically, the decoding utilizes equation 6 above.

The most probable sequence of hypothesis words is provided to a confidence measure module 420. Confidence measure module 420 identifies which words are most likely to have been improperly identified by the speech recognizer, based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although FIG. 4 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method comprising:

reducing noise in a representation of a portion of a noisy signal to produce a representation of a portion of a noise-reduced signal using an acoustic-environment model;

identifying an uncertainty associated with reducing the noise by computing a difference between an expectation for the square of the portion of the noise-reduced signal and the square of the expectation for the portion of the noise-reduced signal; and using the uncertainty and the portion of the noise-reduced signal to decode a pattern state.

2. The method of claim 1 using the uncertainty and the portion of the noise-reduced signal to decode a pattern state comprises:

using the uncertainty to adjust a probability distribution to form a modified probability distribution; and using the representation of a portion of the noise-reduced signal and the modified probability distribution to decode the pattern state.

3. A computer-readable medium having computer-executable instructions for performing steps comprising:

converting a frame of a noisy signal into a feature vector comprising at least two components;

reducing noise in a component of the feature vector for the noisy signal to produce a component of a feature vector for a cleaned signal by utilizing an acoustic distortion model;

identifying an uncertainty associated with reducing the noise from the component by computing a difference between an expectation for a square of a feature vector for a cleaned signal and a square of the expectation for a feature vector for a cleaned signal; and using the uncertainty to decode a phonetic state.

4. The computer-readable medium of claim 3 wherein the computer-executable instructions perform further steps comprising:

determining a probability component of a probability for a phonetic state based in part on the component for the cleaned signal and the uncertainty associated with reducing the noise from the component; and using the probability component to determine the probability of the phonetic state regardless of the value of the uncertainty.

5. The computer-readable medium of claim 4 wherein determining a probability component comprises defining a probability distribution based in part on the uncertainty.

6. The computer-readable medium of claim 5 wherein defining a probability distribution comprises adding the uncertainty to a variance of a probability distribution.

* * * * *